(12) United States Patent
Hashimoto

(10) Patent No.: US 6,409,641 B1
(45) Date of Patent: Jun. 25, 2002

(54) CLEANING DEVICE FOR MACHINE TOOL

(75) Inventor: Narihiko Hashimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/374,677

(22) Filed: Aug. 5, 1999

(30) Foreign Application Priority Data

Aug. 10, 1998 (JP) ............................................. 10-225864

(51) Int. Cl.7 ......................... B23Q 3/157; B23Q 11/10; B23C 9/00; B23B 47/00
(52) U.S. Cl. ............................ 483/13; 408/56; 409/137; 483/2
(58) Field of Search .................. 483/13, 1, 2; 409/136, 409/137, 233, 234; 408/56, 61

(56) References Cited

U.S. PATENT DOCUMENTS

| | | | | |
|---|---|---|---|---|
| 3,595,109 A | * | 7/1971 | Burroughs et al. | 483/13 UX |
| 3,804,426 A | * | 4/1974 | Mickas | 483/13 UX |
| 3,901,108 A | * | 8/1975 | Slavinski et al. | 82/36 R |
| 4,185,376 A | * | 1/1980 | Johnstone | 483/13 X |
| 4,404,728 A | * | 9/1983 | Ishikawa | 483/13 |
| 4,915,553 A | * | 4/1990 | Lazarevic | 483/13 UX |
| 4,951,578 A | * | 8/1990 | von Haas et al. | 409/136 |
| 6,059,702 A | * | 5/2000 | Winkler et al. | 483/13 |

FOREIGN PATENT DOCUMENTS

| | | | | |
|---|---|---|---|---|
| EP | 855245 | * | 7/1998 | 483/13 |
| JP | A-6-238543 | | 8/1994 | |
| JP | 38558 | * | 2/2001 | 483/13 |

* cited by examiner

Primary Examiner—William Briggs
(74) Attorney, Agent, or Firm—Oliff & Berridge, PLC

(57) ABSTRACT

A cleaning device for a machine tool is provided wherein the machine tool is provided with an automatic tool change mechanism for replacing a tool attached to a main shaft by another tool, and a cutting fluid nozzle for emitting coolant supplied from a coolant pump to a cutting location where a workpiece is machined by a tool. The cleaning device has at least one cleaning nozzle from which clean coolant is sprayed toward portions of the machine tool where adherence of machining chips affects changing of tools. The cleaning nozzle includes a nozzle hole that is open downwards, and an inclined wall that faces the opening of the nozzle hole and is inclined in a direction pointing to the tool. During changing of tools, clean coolant is supplied from the coolant pump to the cleaning nozzles through a filter.

29 Claims, 10 Drawing Sheets

CLEANING DEVICE FOR MACHINE TOOL

BACKGROUND OF THE INVENTION

1. Field of Invention

The invention relates to a cleaning device for a machine tool, which is adapted to remove chips that affect the changing of tools during a tool change by an automatic tool change mechanism.

2. Description of Related Art

In various types of machining tools, such as a machining center, a cutting fluid supply device is provided for supplying a large amount of cutting fluid or coolant to a portion of a workpiece that is subject to machining by a tool, in order to improve the machining capability of the tool, to improve the machining accuracy and to prolong the service life of the tool.

In the above type of machine tool, chips resulting from the machining process tend to scatter around the tool and the workpiece. To avoid scattering of the chips, a cover is provided which surrounds the tool and the workpiece.

If the tool and the workpiece are surrounded by the cover, however, the size and cost of the equipment are undesirably increased, and more frequent cleaning is required for removing the chips.

In a cutting fluid supply device as disclosed in Japanese laid-open Patent Publication No. 6-238543, a curtain consisting of a coolant fluid is formed around a cutting location where a workpiece is machined by the tool, so as to avoid the scattering of chips.

In the known cutting fluid supply device, however, scattering of chips may be prevented by the coolant curtain, but the coolant fluid spatters or splashes, to adhere to various portions of the machine tool. In some cases, the coolant contains chips, or chips adhere to the spattering coolant.

If such chips are transferred onto a shank of a tool, or the like, the chips may affect the changing of tools by an automatic tool change mechanism, resulting in a reduced machining accuracy.

SUMMARY OF THE INVENTION

It is therefore an object of the invention to provide a cleaning device for a machining tool, which is able to remove chips, and the like, that affect the changing of tools.

To accomplish the object, the invention provides a cleaning device for a machine tool including an automatic tool change mechanism adapted to replace a tool attached to a main shaft by another tool, a pump that supplies coolant, and a cutting fluid nozzle that emits the coolant supplied from the pump, toward a location where a workpiece is machined by the tool, the cleaning device comprising at least one cleaning nozzle that emits clean coolant toward at least one portion of the machine tool where adherence of chips affects the changing of tools.

In the operation of the cleaning device of the invention, jets of clean coolant are emitted from the cleaning nozzles to locations where adherence of chips affects the changing of tools, thus avoiding such problems as a reduction in the machining accuracy and damage to tools, which would otherwise occur due to the adherence of chips to the tool.

In one preferred form of the invention, the cleaning device further includes a filter that purifies the coolant supplied from the pump, and supplies the purified coolant to the above-indicated at least one cleaning nozzle.

By use of the filter through which coolant is supplied from the coolant pump to the cleaning nozzles, purified coolant can be easily obtained.

In another preferred form of the invention, the cleaning device further includes a directional control valve that is placed in a selected one of a first position in which the coolant is supplied from the pump to the cutting fluid nozzle, and a second position in which the coolant is supplied from the pump to the above-indicated at least one cleaning nozzle.

With the above arrangement in which the coolant is selectively supplied to the cutting fluid nozzle or cleaning nozzles through the directional control valve, the cleaning device of the invention can be easily introduced or incorporated into conventional equipment or machines.

In a further preferred form of the invention, the automatic tool change mechanism includes a swing arm adapted for changing tools and an air cylinder that produces an air pressure for driving the swing arm. In this form, the directional control valve is switched from the first position to the second position in response to the air pressure of the air cylinder upon driving of the swing arm.

Thus, the directional control valve can be switched from the first position to the second position only by applying the air pressure of the air cylinder to the valve upon a change of tools or upon driving of the swing arm. This eliminates a need to provide a special control system for effecting switching of the directional control valve.

In a still another preferred form of the invention, the cleaning nozzles emit jets of the coolant during a tool changing operation of the automatic tool changing mechanism. In this case, cleaning can be effectively accomplished in a short time, and the tool change can be carried out in a state in which the tool and its surroundings have been just cleaned.

In another preferred form of the invention, the above-indicated at least one cleaning nozzle includes a first cleaning nozzle that emits a jet of the coolant toward a tool holder to which the tool is attached during the changing of tools by the automatic tool changing mechanism. Thus, the coolant is ejected from the first cleaning nozzle so that the tool holder is surely or thoroughly cleaned.

In the above form of the invention, the first cleaning nozzle may emit the coolant toward at least a shank portion of the tool holder. In this case, the shank portion to which chips are most likely to adhere can be surely cleaned.

In the above form of the invention, the first cleaning nozzle may include a nozzle hole that is open downwards, and an inclined wall that faces an opening of the nozzle hole and is inclined so as to direct the coolant from the nozzle hole toward the tool. With this arrangement, the coolant from the first cleaning nozzle is directed toward the tool after impinging upon the inclined wall.

In the above form of the invention, the first cleaning nozzle may be formed in a ring-like shape, and include a plurality of nozzle holes that are open downwards and arranged along substantially the same circle, and an inclined wall that is formed continuously in a circumferential direction, the inclined wall facing openings of the nozzle holes and being inclined so as to direct the coolant from the nozzle holes toward the tool.

Since the inclined wall is formed continuously in the circumferential direction, the coolant ejected from each of the nozzle holes spreads over a sufficiently wide area, and flows of coolant from the adjacent nozzle holes are joined together, to form a coolant film or curtain having an inverted conical shape around the main shaft, so that the coolant is directed toward the center of rotation of the main shaft. Thus, the coolant is uniformly sprayed completely over the entire periphery of the tool holder to effect highly efficient cleaning. Also, if the nozzle holes and the ring-like inclined wall are formed in a single member, the manufacturing cost is reduced, and the mounting procedure can be simplified.

In another preferred form of the invention, the above-indicated at least one cleaning nozzle includes a plurality of cleaning nozzles with a plurality of inclined walls having different angles of inclination. In this case, different portions of the tool holder can be effectively cleaned by the coolant ejected from the cleaning nozzles.

In another preferred form of the invention, the above-indicated at least one cleaning nozzle further includes a second cleaning nozzle that emits a jet of the coolant toward the swing arm of the automatic tool change mechanism. With this arrangement, the coolant is ejected from the second cleaning nozzle so as to surely clean the swing arm of the automatic tool change mechanism.

In another preferred form of the invention, the main shaft has an axis that extends in a vertical direction of the machine tool, and the above-indicated at least one cleaning nozzle further includes a third cleaning nozzle that emits a jet of the coolant toward a lower surface of a main shaft head of the main shaft. With this arrangement, the coolant is ejected from the third cleaning nozzle so as to surely clean the lower surface of the main shaft head.

In another preferred form of the invention, the above-indicated at least one cleaning nozzle further includes a fourth cleaning nozzle that emits a jet of the coolant toward a tool pot of the automatic tool change mechanism. With this arrangement, the coolant is ejected from the fourth cleaning nozzle so as to surely clean the tool pot of the automatic tool change mechanism.

BRIEF DESCRIPTION OF THE DRAWINGS

The invention will be described in greater detail with reference to preferred embodiments thereof and the accompanying drawings, wherein.

DETAILED DESCRIPTION OF PREFERRED EMBODIMENTS

One preferred embodiment of the invention will be described in detail with reference to the accompanying drawings.

Figure 1:
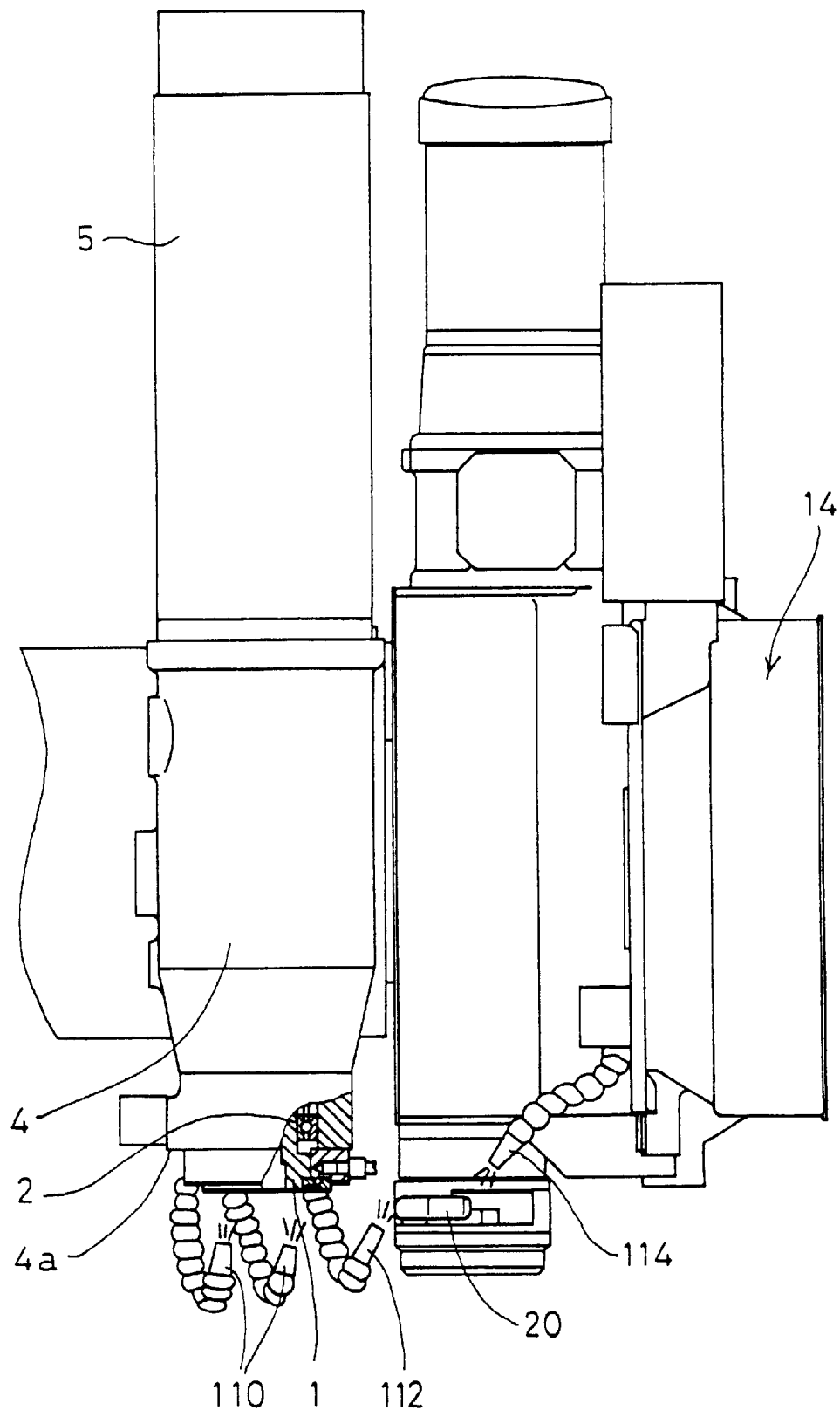
FIG. 1 is a front view showing a machine tool that employs a cleaning device according to one embodiment of the invention.

As shown in FIG. 1, a machine tool provided with a cleaning device of the invention includes a main shaft head 4 in which a main shaft 1 is rotatably supported by a plurality of bearings 2. In the present embodiment, the machine tool is of vertical type with the main shaft 1 mounted in the vertical direction, and is constructed such that the main shaft 1 is driven and rotated by a motor 5.

Figure 4:
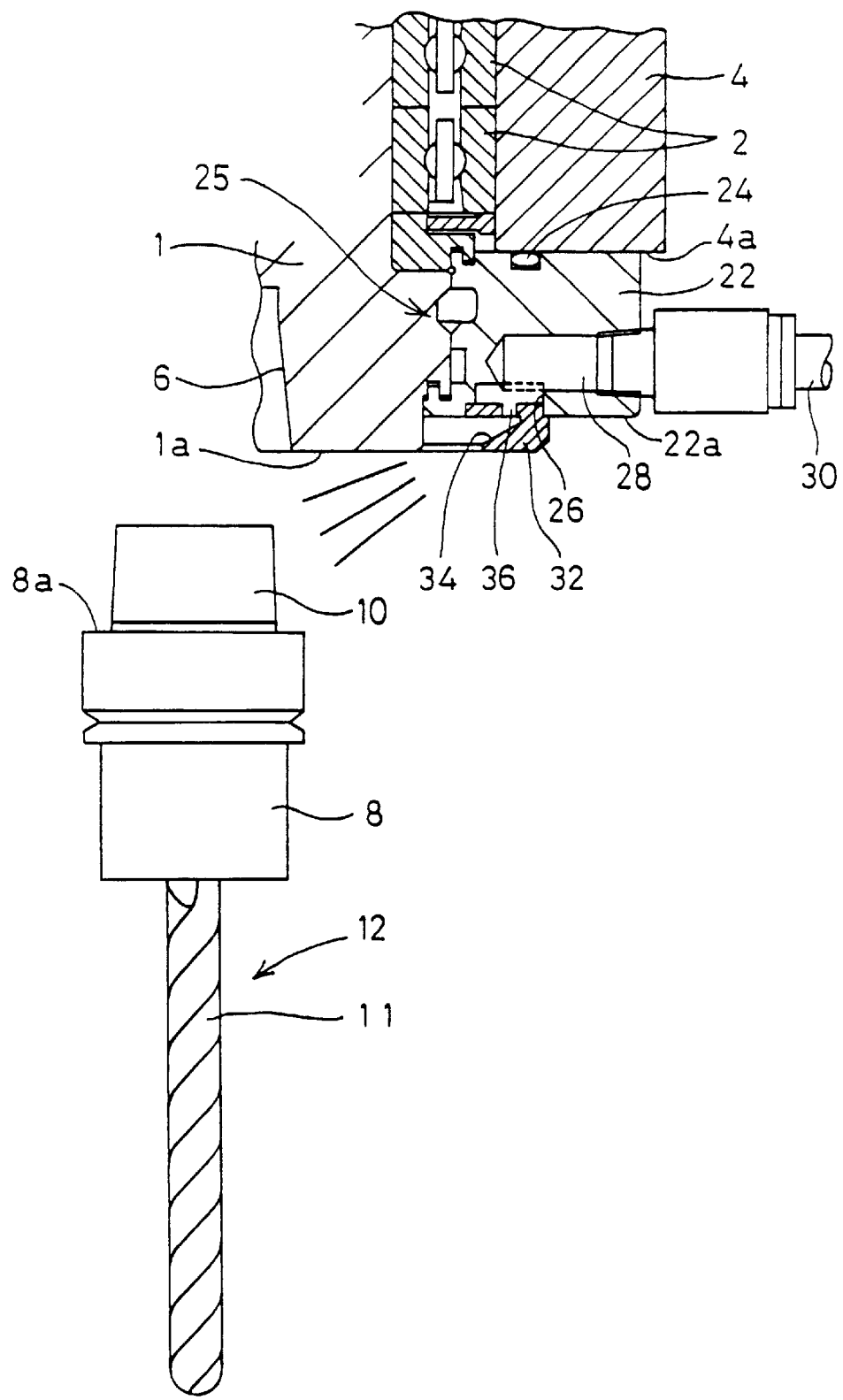
FIG. 4 is an enlarged cross-sectional view showing a lower end portion of a main shaft head of the machine tool that employs the cleaning device of the embodiment of FIG. 1.

The main shaft 1 is formed at its lower end face Ia with a tool receiving hole 6 adapted to receive a tool 12, as shown in FIG. 4. The tool 12 includes a tool holder 8 in which a drill 11, or the like, is mounted, and the tool holder 8 is formed with a tapered shank 10. The tool receiving hole 6 is tapered such that the tapered shank 10 of the tool holder 8 snugly fits in the hole 6.

In the present embodiment, when the shank 10 is inserted in the tool receiving hole 6, the lower end face 1a of the main shaft 1 rests on an end face 8a of the tool holder 8 so that relative movement between the main shaft 1 and the tool holder 8 is restricted due to abutting contact between the end faces 1a, 8a. The main shaft 1 incorporates a holding mechanism (not shown) that serves to hold the tool holder 8 received in the tool receiving hole 6. In this connection, the tool holder 8 may have a so-called BT shank.

Figure 2:
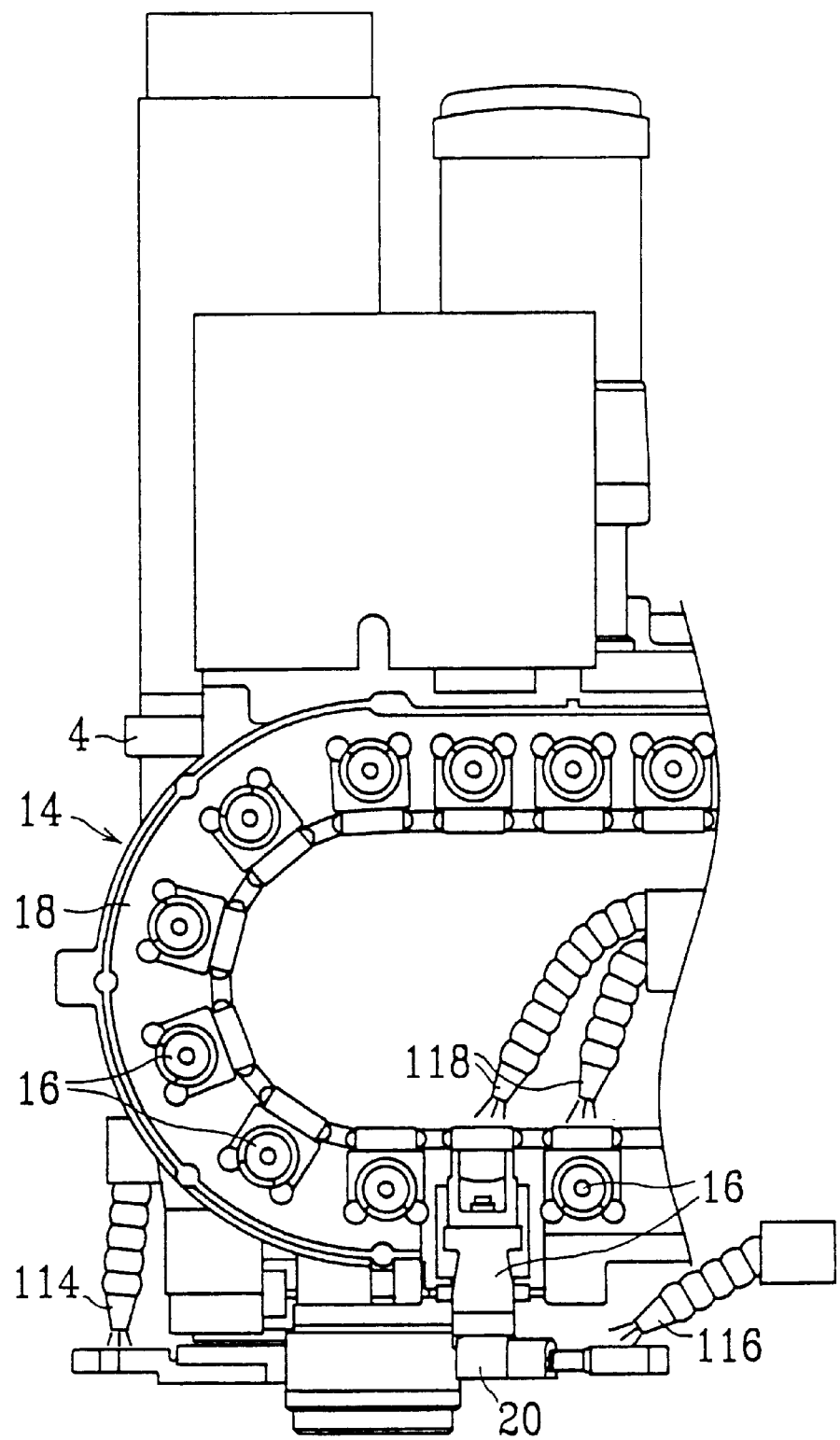
FIG. 2 is a side view of the machine tool that employs the cleaning device of the embodiment of FIG. 1.

An automatic tool change mechanism 14 is attached to the side face of the main shaft head 4. As shown in FIG. 2, the automatic tool change mechanism 14 includes a magazine 18 in which a plurality of pots 16 are connected into a chain-like form. Various types of tools 12 are removably inserted in the respective pots 16. In operation, the magazine 18 moves or feeds the pots 16 in response to a command signal, so as to transport a desired tool 12 to a predetermined position for loading.

The automatic tool change mechanism 14 includes a swing arm 20 that revolves around an axis parallel with the main shaft 1, and the swing arm 20 chucks or holds the tool holder 8 attached to the main shaft 1 and the tool holder 8 transported to the predetermined loading position. Upon a change of tools, the swing arm 20 is lowered, and rotated 180 degrees after the tool holders 8 are removed or detached from the main shaft 1 and the pot 16, respectively. The swing arm 20 is then elevated so that a new tool holder 8 is attached to the main shaft 1, and the tool holder 8 that had been attached to the main shaft 1 is returned to the pot 16.

As shown in FIG. 4, an annular main shaft cap 22 is attached to the lower end face 4a of the main shaft head 4 with an O ring 24 interposed therebetween, and a labyrinth packing 25 is formed between the main shaft 1 and the main shaft cap 22, so as to prevent entry of coolant.

Figure 5:
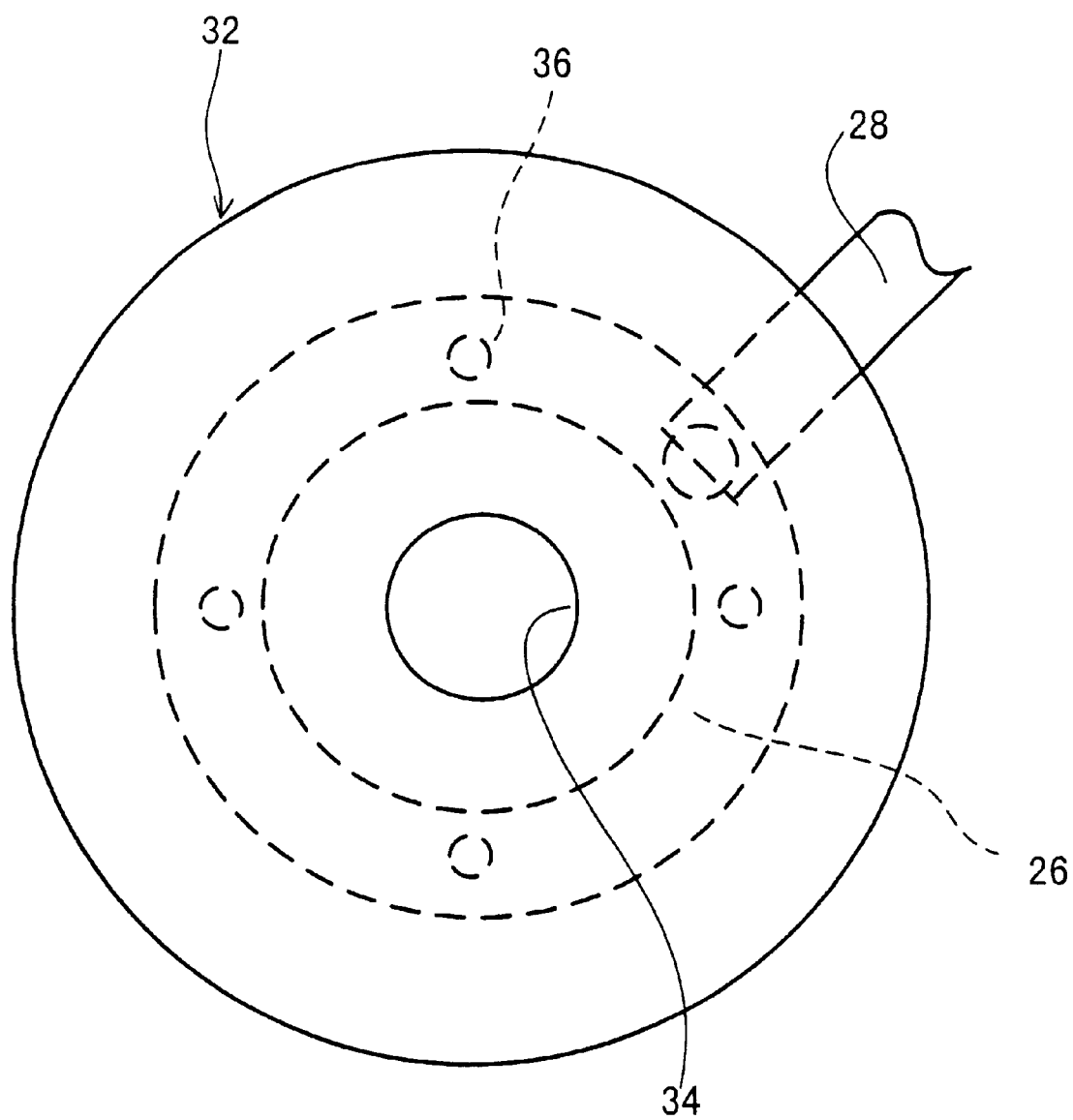
FIG. 5 is a bottom view of a cleaning nozzle of the embodiment of FIG. 1.

An annular groove 26 is formed in the lower end face 22a of the main shaft cap 22, and a coolant hose 30 is connected to a connection hole 28 that is formed in the main shaft cap 22 for communication with the groove 26. A ring-like cleaning nozzle 32 is attached to the main shaft cap 22 so as to substantially close the groove 26. The cleaning nozzle 32 has an inclined wall 34 that is formed continuously in the circumferential direction and inclined such that an extension of the inclined wall 34 is directed toward the tool 12. Also, as shown in FIG. 5, four nozzle holes 36 that communicate with the groove 26 are formed through the cleaning nozzle 32 at equally spaced positions on the same circle about the tool receiving hole 6, such that the openings of the nozzle holes 36 face the inclined wall 34.

The inclined wall 34 is formed so that jet streams of coolant ejected from the nozzle holes 36 impinge upon the inclined wall 34, and are directed toward the center of rotation of the main shaft 1 along the inclined wall 34. Also, the angle of inclination of the inclined wall 34 is selected so that the coolant streams are sprayed onto the shank 10 of the new tool holder 8 held by the swing arm 20 during tool change. Where the shank 10 is tapered by a degree of $\frac{1}{10}$, ie, a ratio of diameter to length. For example, the inclined wall 34 is inclined about 50 degrees downwards with respect to the horizontal plane, so as to achieve the most effective cleaning.

Figure 6:
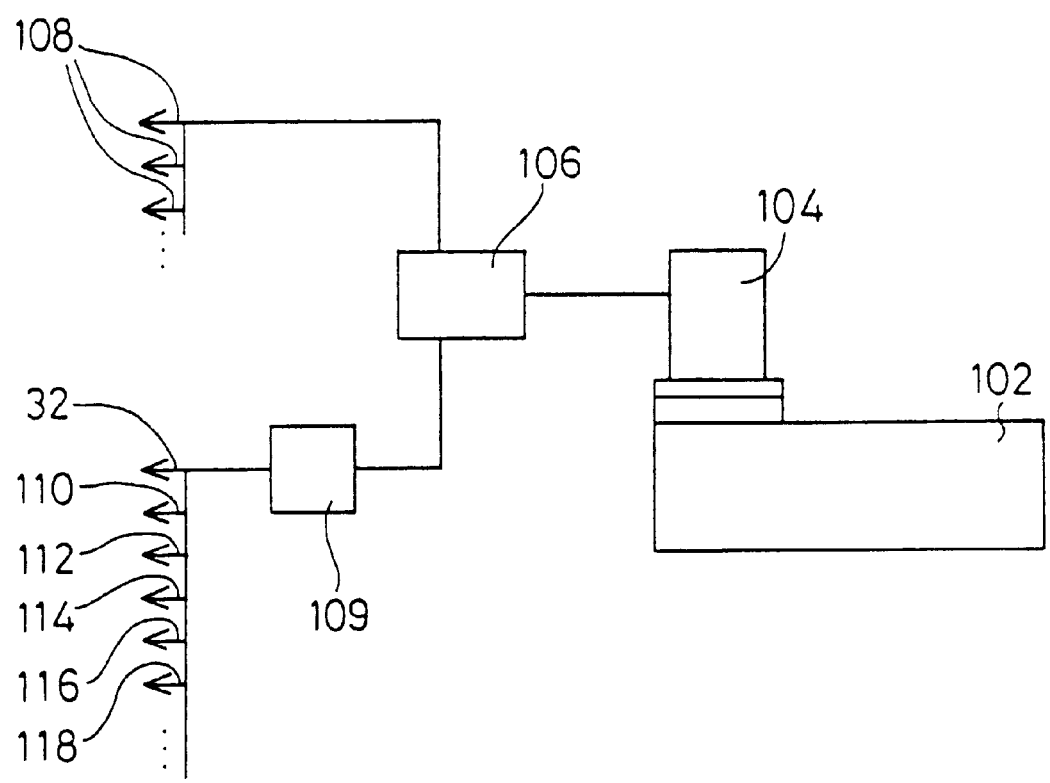
FIG. 6 is a view showing a coolant supply system of the embodiment of FIG. 1.

As shown in FIG. 6, a coolant tank 102 is provided for storing coolant fluid therein, and the coolant in the coolant tank 102 is pressurized and discharged by means of a coolant pump 104. A directional control valve 106 is connected to the discharge port or outlet of the coolant pump 104, and cutting-fluid nozzles 108 are connected to the discharge port of the coolant pump 104 via the directional control valve 106. The cutting-fluid nozzles 108 are positioned so that jets of coolant ejected from the nozzles 108 are directed to cutting locations where cutting operations by the tool 12 take place.

The coolant pump 104 is also connected to the cleaning nozzle 32 via the directional control valve 106. A filter 109, for removing chips from the coolant, is interposed between the directional control valve 106 and the cleaning nozzle 32, so that purified coolant can be ejected from the cleaning nozzle 32.

Figure 3:
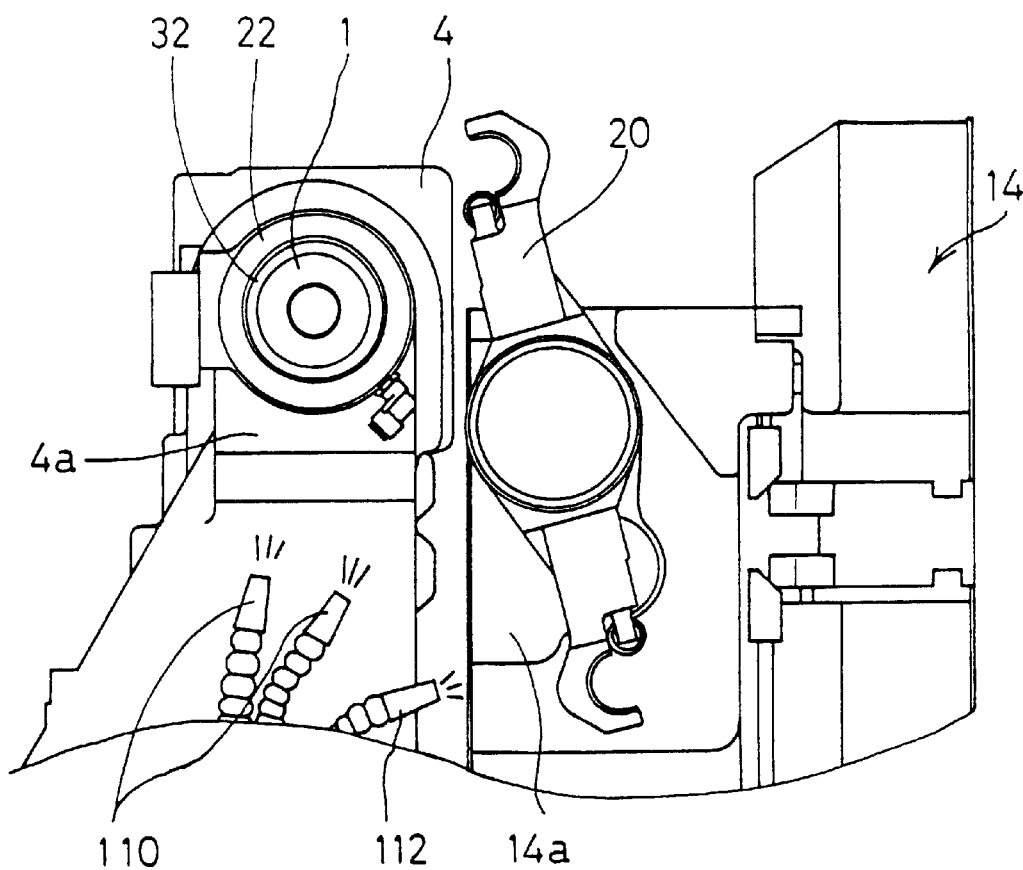
FIG. 3 is a bottom view of the machine tool that employs the cleaning device of the embodiment of FIG. 1.

In addition to the cleaning nozzle 32 as described above, other cleaning nozzles for emitting coolant are provided at locations where adherence of chips may affect the changing of the tool 12 by the automatic tool change mechanism 14. For example, cleaning nozzles 110 are provided from which coolant is ejected toward the lower end face 4a of the main shaft head 4, as shown in FIGS. 1 through 3. The cleaning nozzles 110 are located at positions where the coolant ejected from the nozzles 110 can remove chips adhering to the lower end face 4a of the main shaft head 4.

Similarly, there are provided a cleaning nozzle 112 for emitting coolant toward the lower end face 14a of the automatic tool change mechanism 14, cleaning nozzles 114, 116 for emitting coolant toward the swing arm 20, and cleaning nozzles 118 for emitting coolant toward the pots 16 of the automatic tool change mechanisms 14. Other cleaning nozzles can be provided as necessary. Each of the cleaning nozzles 110, 112, 114, 116, 118 is connected to the directional control valve 106 through the filter 109.

The operation of the cleaning device for the machine tool according to the embodiment as described above will be now described.

The machine tool performs cutting operations by rotating the tool 12 attached to the main shaft 1. During cutting, the directional control valve 106 is placed in the first position in which the coolant pump 104 communicates with the cutting fluid nozzles 108, so that the coolant or cutting fluid supplied from the coolant pump 104 is ejected from the cutting fluid nozzles 108 toward the cutting location.

Because the coolant is sprayed over the rotating tool 12, the coolant spatters or splashes and adheres to surrounding areas. The spattering coolant may contain machining chips. The coolant containing chips may adhere to such locations where the adherence of chips affects changing of the tools 12 by the automatic tool change mechanism 14. Namely, the coolant drops from the locations, and the chips contained in the coolant adhere to the tool 12, in particular, the shank 10 or the end face 8a of the tool holder 8. If the shank 10, with the chips present on its surface, is inserted as it is into the tool receiving hole 6 of the main shaft 1, a clearance is formed due to the chips between the main shaft 1 and the tool 12, which may cause such problems as reduced machining accuracy or damage to the tool if cutting is carried out in the presence of the clearance.

During tool change, therefore, the directional control valve 106 is placed in the second position in which purified coolant is supplied from the coolant pump 104 to the cleaning nozzles 32, 110, 112, 114, 116, 118 through the filter 109. The directional control valve 106 may be switched to the above second position at the same time that the automatic tool change mechanism 14 is actuated, or a switch signal may be generated to the directional control valve 106 upon generation of a drive signal to the tool change mechanism 14. As another method, a pilot pressure produced from the air pressure of an air cylinder for driving the swing arm 20 may be introduced into the directional control valve 106, so as to place the valve 106 in the second position. In the latter case, in particular, no special control system is required for switching the directional control valve 106.

With the directional control valve 106 placed in the second position as described above, jet streams of coolant are emitted from the cleaning nozzles 32 toward the inclined wall 34 through the nozzle holes 36. The coolant impinging upon the inclined wall 34 then is directed toward the center of the main shaft 1 along the inclined wall 34. Since the inclined wall 34 is formed continuously in the circumferential direction, the coolant ejected from each of the nozzle holes 36 spreads over a sufficiently wide area, and the directed coolant from the adjacent nozzle holes 36 is joined together, to form a coolant film or curtain having an inverted conical shape around the main shaft 1, which points to the center of rotation of the main shaft 1. In this manner, the coolant is uniformly sprayed all over the entire periphery of the shank 10, to clean the shank 10 with high efficiency.

During tool change, the tool 12 held by the swing arm 20 is attached to the main shaft 1 while being exposed to purified coolant ejected from the cleaning nozzle 32. Thus, the purified coolant flushes away chips adhering to the shank 10 or the end face 8a, and therefore no problem is caused by chips that would be otherwise trapped between the shank 10 or end face 8a and the main shaft 1 when the tool 12 is mounted on the main shaft 1.

The purified coolant is also emitted from the cleaning nozzles 110 toward the lower end face 4a of the main shaft head 4, so as to flush away chips adhering to the lower end face 4a. If the coolant adhering to the lower end face 4a, which contains machining chips, drops onto the shank 10 or the end face 8a of the tool holder 8 during a tool change, the chips may enter between the shank 10 or end face 8a and the main shaft 1. This situation can be avoided by cleaning the lower end face 4a with the purified coolant.

Furthermore, the purified coolant is emitted from the cleaning nozzle 112 toward the lower end face 14a of the automatic tool change mechanism 14, so as to flush away chip containing coolant on the end face 14a. Consequently, adherence of chips to the shank 10 or the end face 8a of the tool holder 8 can be avoided.

The purified coolant is also emitted from the cleaning nozzles 114, 116 toward the swing arm 20, so as to flush away chips adhering to the swing arm 20. If any chips are present on the swing arm 20, the chips may be transferred to the tool 12 chucked to the swing arm 20, and enter between the shank 10 and the main shaft 1 when the tool 12 is mounted in the main shaft 1. This situation can be avoided by cleaning the swing arm 20 with the purified coolant.

The coolant ejected from the cleaning nozzles 118 is used for cleaning the pots 16, namely, flushing away chips adhering to the pots 16, thereby to prevent otherwise possible problems. If coolant containing chips adheres to any one of the pots 16, the chips may be transferred to the tool 12 when it is stored into the pot 16, causing the problems as described above when the same tool 12 is subsequently mounted in the main shaft 1 upon change of tools. Such problems can be avoided by cleaning the pots with the purified coolant.

It is to be noted that tool change is carried out in a short period of time, for example, about 0.8 seconds, and therefore the coolant is emitted from the above cleaning nozzles only for that length of time. Since the amount of coolant used for cleaning during a single tool-change operation is as small as about 300 cc, the filter 109 for purifying the coolant may be small-sized.

It is to be understood that the invention is not limited to details of the illustrated embodiment, but may be otherwise embodied with various changes or modifications, without departing from the principle of the invention.

While the filter 109 for purifying coolant is provided so as to allow circulation and repeated use of the coolant in the illustrated embodiment, the filter 109 may be eliminated if clean coolant fluid that has not been used is supplied to each of the cleaning nozzles.

Figure 7:
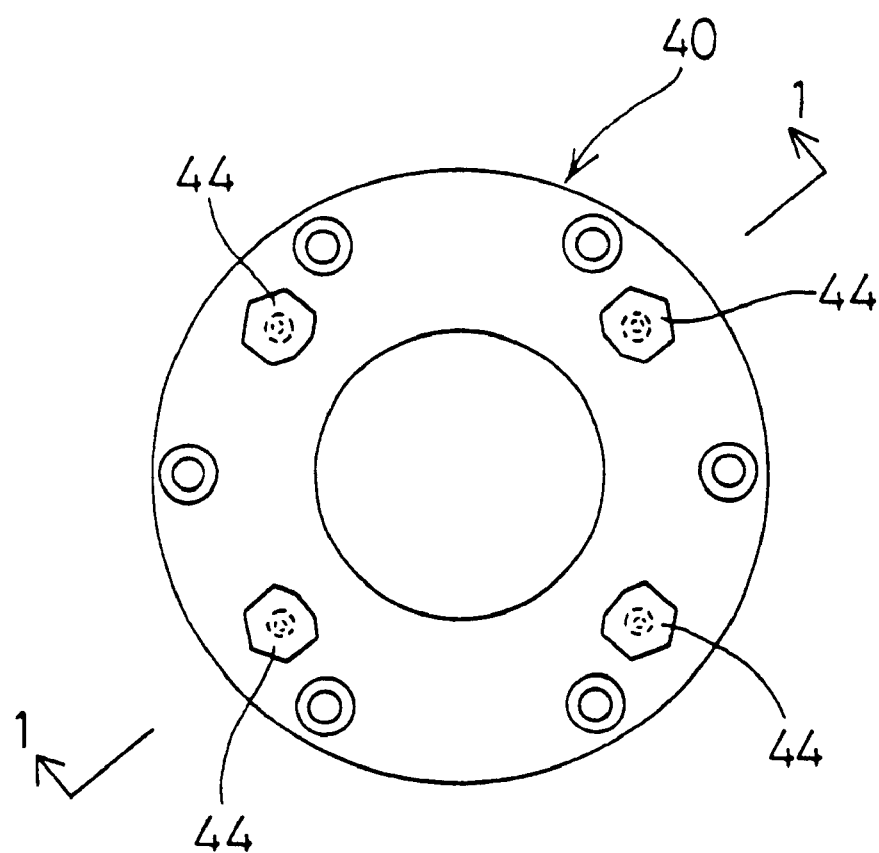
FIG. 7 is a plan view of a cleaning nozzle assembly as a first modified example.
Figure 8:
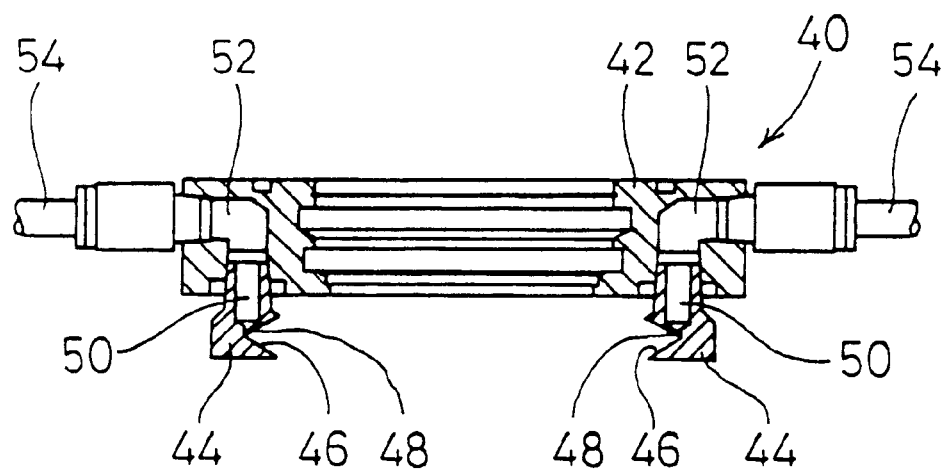
FIG. 8 is a cross-sectional view taken along line 1—1 of FIG. 7.

The cleaning nozzle 32 is not limited to that having the configuration as described above, but may be replaced by a cleaning nozzle assembly 40 as a first modified example as shown in FIGS. 7 and 8. The cleaning nozzle assembly 40 includes a ring-like or annular cap member 42, and four nozzle members 44 attached to the lower end face of the cap member 42 such that the nozzle members 44 are equally spaced apart from each other on the same circle. Each of the nozzle members 44 is formed with an inclined wall 46 having substantially the same angle as the inclined wall 34 as described above, and a nozzle hole 48 is formed through each nozzle member 44 to be open toward the inclined wall 46.

The nozzle holes 48 are connected to respective coolant hoses 54 through connection holes 50 of the nozzle members 44 and connection holes 52 of the cap member 42. In this example, too, jets of coolant emitted from the four nozzle holes 48 impinge upon the inclined walls 46, and are directed toward the center of the main shaft 1 along the inclined walls 46.

Figure 9:
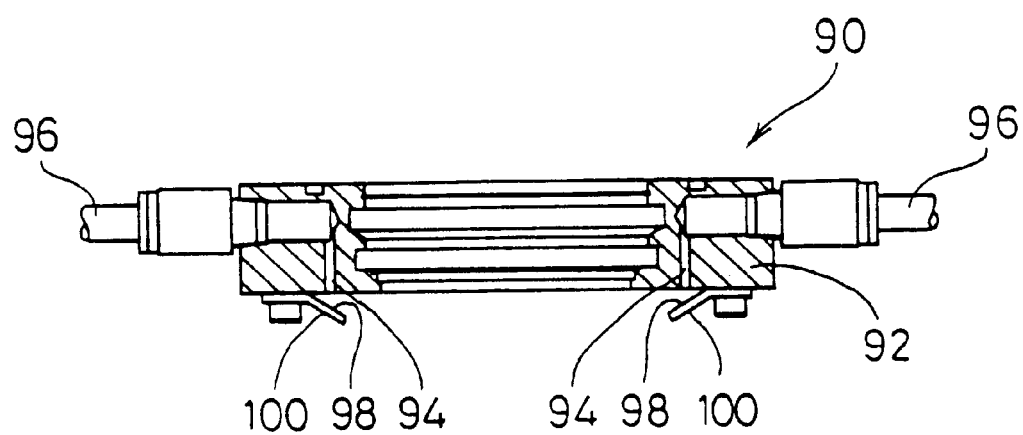
FIG. 9 is a cross-sectional view showing a cleaning nozzle assembly as a second modified example.

As a second modified example, a cleaning nozzle assembly 90 as shown in FIG. 9 may also be employed. The cleaning nozzle assembly 90 includes a ring-like cap member 92, and four nozzle holes 94 are formed in the cap member 92 to be open downwards. The nozzle holes 94 are respectively connected to coolant hoses 96.

For each of the nozzle holes 94, a wall member 100 having an inclined wall 98 is attached to the cap member 92, such that the opening of the nozzle hole 94 faces the inclined wall 98. The wall member 100 with the inclined wall 98 is formed by bending a flat plate, and the angle of inclination of the inclined wall 98 is substantially the same as those of the inclined walls 34, 46 as described above. The coolant ejected from the four nozzle holes 94 impinge upon the inclined walls 98, and is directed toward the center of the main shaft 1 along the inclined walls 98.

Figure 10:
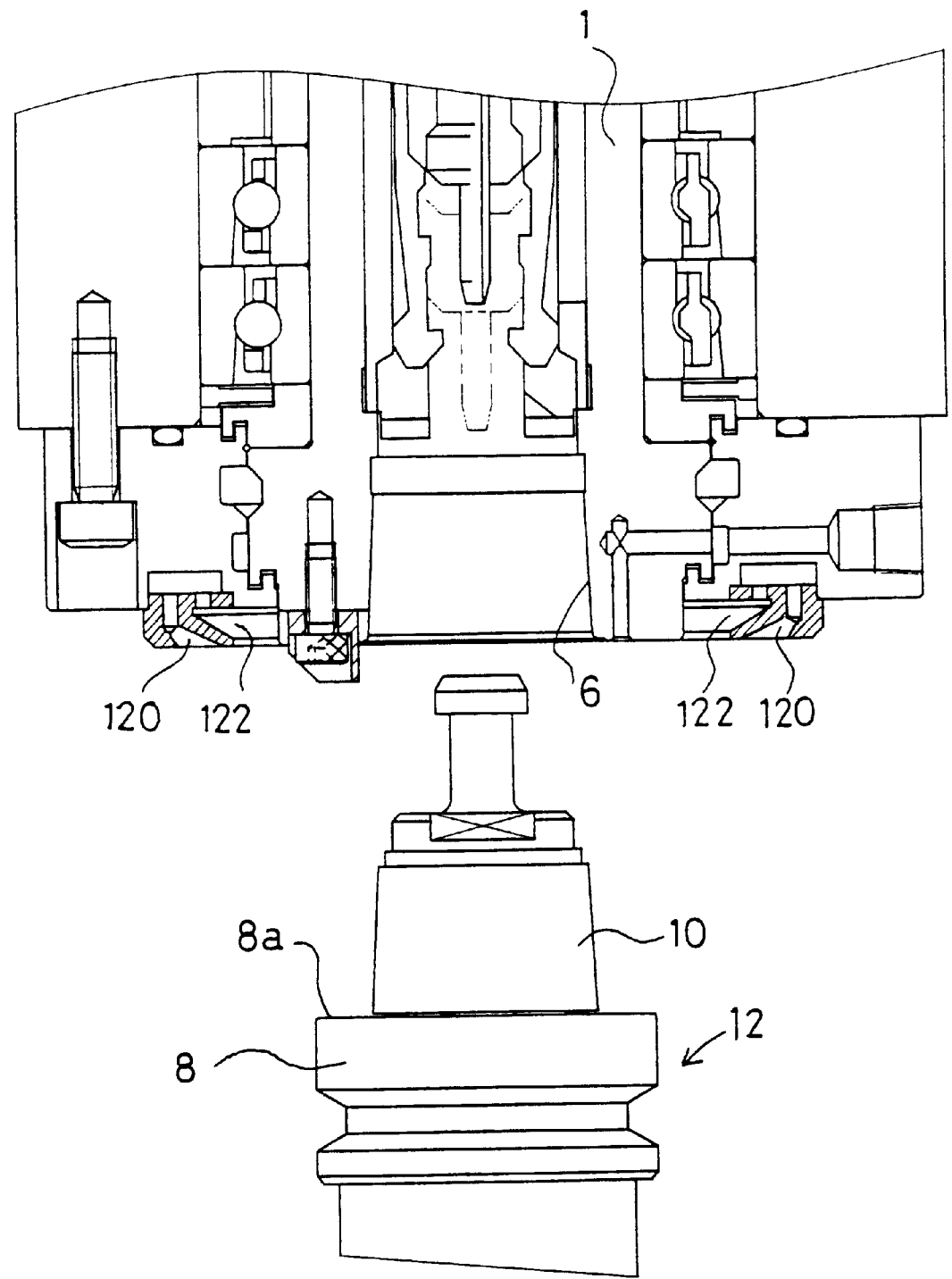
FIG. 10 is a cross-sectional view showing a lower end portion of a main shaft head of a machine tool that employs a cleaning device according to the second embodiment of the invention.

While only the cleaning nozzle 32 is provided for cleaning the shank 10 in the first embodiment, two types of cleaning nozzles that differ in the angle of inclined walls may be provided as in the second embodiment as shown in FIG. 10. In the second embodiment, an outer cleaning nozzle 120 and an inner cleaning nozzle 122 are provided. The outer cleaning nozzle 120 produces a jet of coolant to be directed toward the lower portion of the tool holder, while the inner cleaning nozzle 122 produces a jet of coolant to be directed toward the upper portion of the tool holder. More specifically, the angle of the inclined wall of the outer cleaning nozzle 120 is determined so that the coolant ejected from the nozzle 120 can most effectively clean the end face 8a of the tool holder 8, and the angle of the inclined wall of the inner cleaning nozzle 122 is determined so that the coolant ejected from the nozzle 122 can most effectively clean the tapered surface of the shank 10. With this arrangement, both the tapered surface of the shank 10 and the end face 8a are most effectively or efficiently cleaned, and therefore the amount of coolant emitted from these nozzles can be advantageously reduced. While the two types of cleaning nozzles are provided in the second embodiment, three or more types of cleaning nozzles having different angles of inclined walls may be provided.

What is claimed is:

1. A cleaning device for a machine tool including an automatic tool change mechanism adapted to replace a tool attached to a main shaft by another tool, a pump that supplies coolant, and a cutting fluid nozzle that emits the coolant supplied from the pump, toward a location where a workpiece is machined by the tool, the cleaning device comprising:

at least one cleaning nozzle that emits clean coolant toward at least one portion of the machine tool where adherence of chips affects changing of tools, wherein the at least one cleaning nozzle comprises a nozzle hole that is open downwards, and an inclined wall that faces an opening of the nozzle hole and is inclined so as to direct the coolant from the nozzle hole toward the tool.

2. The cleaning device for a machine tool according to claim 1, further comprising a filter that purifies the coolant supplied from the pump, and supplies the purified coolant to the at least one cleaning nozzle.

3. The cleaning device for a machine tool according to claim 1, further comprising a directional control valve that is placed in a selected one of a first position in which the coolant is supplied from the pump to the cutting fluid nozzle, and a second position in which the coolant is supplied from the pump to the at least one cleaning nozzle.

4. The cleaning device for a machine tool according to claim 3, wherein the automatic tool change mechanism comprises a swing arm adapted for changing tools, and an air cylinder that produces an air pressure for driving the swing arm, and the directional control valve is switched from the first position to the second position in response to the air pressure of the air cylinder upon driving of the swing arm.

5. The cleaning device for a machine tool according to claim 1, wherein the at least one cleaning nozzle emits the coolant during a tool changing operation of the automatic tool change mechanism, the tool changing operation in response to a command signal.

6. The cleaning device for a machine tool according to claim 1, wherein the at least one cleaning nozzle comprises a first cleaning nozzle that emits a jet of the coolant toward a tool holder to which the tool is attached, during changing of tools by the automatic tool change mechanism.

7. The cleaning device for a machine tool according to claim 6, wherein the first cleaning nozzle emits the coolant toward at least a shank portion of the tool holder.

8. A cleaning device for a machine tool including an automatic tool change mechanism adapted to replace a tool attached to a main shaft by another tool, a pump that supplies coolant, and a cutting fluid nozzle that emits the coolant supplied from the pump, toward a location where a workpiece is machined by the tool, the cleaning device comprising:

at least one cleaning nozzle that emits clean coolant toward at least one portion of the machine tool where adherence of chips affects changing of tools; and a directional control valve that is placed in a selected one of a first position in which the coolant is supplied from the pump to the cutting fluid nozzle, and a second position in which the coolant is supplied from the pump to the at least one cleaning nozzle, wherein the automatic tool change mechanism comprises a swing arm adapted for changing tools, and an air cylinder that produces an air pressure for driving the swing arm, and the directional control valve is switched from the first position to the second position in response to the air pressure of the air cylinder upon driving of the swing arm.

9. The cleaning device for a machine tool according to claim 6, wherein the at least one cleaning nozzle is formed in a ring-like shape, and includes a plurality of nozzle holes that are open downwards and are arranged along substantially the same circle, and the inclined wall is formed continuously in a circumferential direction, the inclined wall facing openings of the nozzle holes and being inclined so as to direct the coolant from the nozzle holes toward the tool.

10. The cleaning device for a machine tool according to claim 9, wherein the at least one cleaning nozzle comprises a plurality of cleaning nozzles with a plurality of inclined walls having different angles of inclination.

11. The cleaning device for a machine tool according to claim 6, wherein the at least one cleaning nozzle further comprises a second cleaning nozzle that emits a jet of the coolant toward a swing arm of the automatic tool change mechanism.

12. The cleaning device for a machine tool according to claim 6, wherein the main shaft has an axis that extends in a vertical direction of the machine tool, and wherein the at least one cleaning nozzle further comprises a second cleaning nozzle that emits a jet of the coolant toward a lower surface of a main shaft head of the main shaft.

13. The cleaning device for a machine tool according to claim 6, wherein the at least one cleaning nozzle further comprises a second cleaning nozzle that emits a jet of the coolant toward a tool pot of the automatic tool change mechanism.

14. The cleaning device for a machine tool according to claim 1, wherein the at least one cleaning nozzle comprises a second cleaning nozzle that emits a jet of the coolant toward a swing arm of the automatic tool change mechanism.

15. The cleaning device for a machine tool according to claim 1, wherein the main shaft has an axis that extends in a vertical direction of the machine tool, and wherein said at least one cleaning nozzle comprises a third cleaning nozzle that emits a jet of the coolant toward a lower surface of a main shaft head of the main shaft.

16. The cleaning device for a machine tool according to claim 1, wherein the at least one cleaning nozzle comprises a second cleaning nozzle that emits a jet of the coolant toward a tool pot of the automatic tool change mechanism.

17. A cleaning device for a machine tool including an automatic tool change mechanism adapted to replace a tool attached to a main shaft by another tool, the cleaning device comprising:

a cleaning fluid tank for storing cleaning fluid;

a pump that supplies the cleaning fluid; and at least one cleaning nozzle that emits the cleaning fluid supplied from the pump toward at least one portion of the machine tool where adherence of chips affects changing of tools, wherein the at least one cleaning nozzle comprises a nozzle hole that is open downwards, and an inclined wall that faces an opening of the nozzle hole and is inclined so as to direct the coolant from the nozzle hole toward the tool.

18. The cleaning device for a machine tool according to claim 17, wherein said at least one cleaning nozzle emits the cleaning fluid during changing operation of the automatic tool change mechanism.

19. The cleaning device for a machine tool according to claim 17, wherein the at least one cleaning nozzle comprises a first cleaning nozzle that emits a jet of the cleaning fluid toward a tool holder to which the tool is attached, during changing of tools by the automatic tool change mechanism.

20. The cleaning device for a machine tool according to claim 19, wherein the first cleaning nozzle emits the cleaning fluid toward at least a shank portion of the tool holder.

21. A cleaning device for a machine tool including an automatic tool change mechanism adapted to replace a tool attached to a main shaft by another tool, the cleaning device comprising:

a cleaning fluid tank for storing cleaning fluid;

a pump that supplies the cleaning fluid;

at least one cleaning nozzle that emits the cleaning fluid supplied from the pump toward at least one portion of the machine tool where adherence of chips affects changing of tools; and a directional control valve that is placed in a selected one of a first position in which the coolant is supplied from the pump to the cutting fluid nozzle, and a second position in which the coolant is supplied from the pump to the at least one cleaning nozzle, wherein the automatic tool change mechanism comprises a swing arm adapted for changing tools, and an air cylinder that produces an air pressure for driving the swing arm, and the directional control valve is switched from the first position to the second position in response to the air pressure of the air cylinder upon driving of the swing arm.

22. The cleaning device for a machine tool according to claim 19, wherein the at least one cleaning nozzle is formed in a ring-like shape, and includes a plurality of nozzle holes that are open downwards and are arranged along substantially the same circle, and the inclined wall is formed continuously in a circumferential direction, said inclined wall facing openings of the nozzle holes and being inclined so as to direct the coolant from the nozzle holes toward the tool.

23. The cleaning device for a machine tool according to claim 22, wherein the at least one cleaning nozzle comprises a plurality of cleaning nozzles with a plurality of inclined walls having different angles of inclination.

24. The cleaning device for a machine tool according to claim 19, wherein the at least one cleaning nozzle further comprises a second cleaning nozzle that emits a jet of the cleaning fluid toward a swing arm of the automatic tool change mechanism.

25. The cleaning device for a machine tool according to claim 19, wherein the main shaft has an axis that extends in a vertical direction of the machine tool, and wherein said at least one cleaning nozzle further comprises a second cleaning nozzle that emits a jet of the cleaning fluid toward a lower surface of a main shaft head of the main shaft.

26. The cleaning device for a machine tool according to claim 19, wherein the at least one cleaning nozzle further comprises a second cleaning nozzle that emits a jet of the cleaning fluid toward a tool pot of the automatic tool change mechanism.

27. The cleaning device for a machine tool according to claim 17, wherein the at least one cleaning nozzle comprises a second cleaning nozzle that emits a jet of the cleaning fluid toward a swing arm of the automatic tool change mechanism.

28. The cleaning device for a machine tool according to claim 17, wherein the main shaft has an axis that extends in a vertical direction of the machine tool, and the at least one cleaning nozzle comprises a second cleaning nozzle that emits a jet of the cleaning fluid toward a lower surface of a main shaft head of the main shaft.

29. The cleaning device for a machine tool according to claim 17, wherein the at least one cleaning nozzle comprises a second cleaning nozzle that emits a jet of the cleaning fluid toward a tool pot of the automatic tool change mechanism.

* * * * *